United States Patent [19]
Heath

[11] Patent Number: 5,947,424
[45] Date of Patent: Sep. 7, 1999

[54] PIPE SUPPORT ASSEMBLY WITH RETAINING STRAP

[75] Inventor: Richard W. Heath, Yorba Linda, Calif.

[73] Assignee: Tolco, Incorporated, Corona, Calif.

[21] Appl. No.: 08/509,959

[22] Filed: Aug. 1, 1995

[51] Int. Cl.⁶ ..................................... E21F 17/02
[52] U.S. Cl. ........................... 248/58; 248/72; 248/228.1; 411/527
[58] Field of Search .................. 248/58, 59, 65, 248/72, 228.1, 228.6, 903; 411/937, 527, 174, 175, 427

[56] References Cited

U.S. PATENT DOCUMENTS

| | | | |
|---|---|---|---|
| 1,017,471 | 2/1912 | Ryden et al. | 411/437 X |
| 2,364,880 | 12/1944 | Tinnerman | 411/527 |
| 2,963,251 | 12/1960 | Fuss | 248/228.6 X |
| 3,036,801 | 5/1962 | Cemashko | 248/72 |
| 3,321,161 | 5/1967 | Hirt | 248/72 |
| 4,019,705 | 4/1977 | Habuda, Sr. et al. | 248/58 |

FOREIGN PATENT DOCUMENTS

| | | | |
|---|---|---|---|
| 1239405 | 7/1971 | United Kingdom | 411/527 |
| 2164242 | 3/1986 | United Kingdom | 248/72 |

OTHER PUBLICATIONS

Modern Hanger Corp. catalog p. 29, "Modern Retaining Clips", Jan. 1953.
Erico Products, Inc. catalog p. 12, "Caddy Fasteners for the construction Industry", Mar. 1973.
A specification sheet by AFCON entitled "New Original Design" —the date of the sheet is unknown but it is admitted prior art.

*Primary Examiner*—Derek J. Berger
*Attorney, Agent, or Firm*—Knobbe, Martens, Olson & Bear LLP

[57] ABSTRACT

A beam clamp retaining strap has a beveled locking slot for securing to a threaded hanger rod or set screw of a pipe support assembly mounted to an I-beam. The assembly further comprises a C-type clamp, and the strap may be positioned in any of four possible locations with respect to the clamp, rod, and set screw. The slot edges securely engage between the major and minor thread diameters of the rod or screw. The beveled locking slot provides additional assurance that the clamp grip does not loosen such that the pipe assembly is dislodged, and, thus, the need for an additional nut for the retaining strap is thereby eliminated.

19 Claims, 3 Drawing Sheets

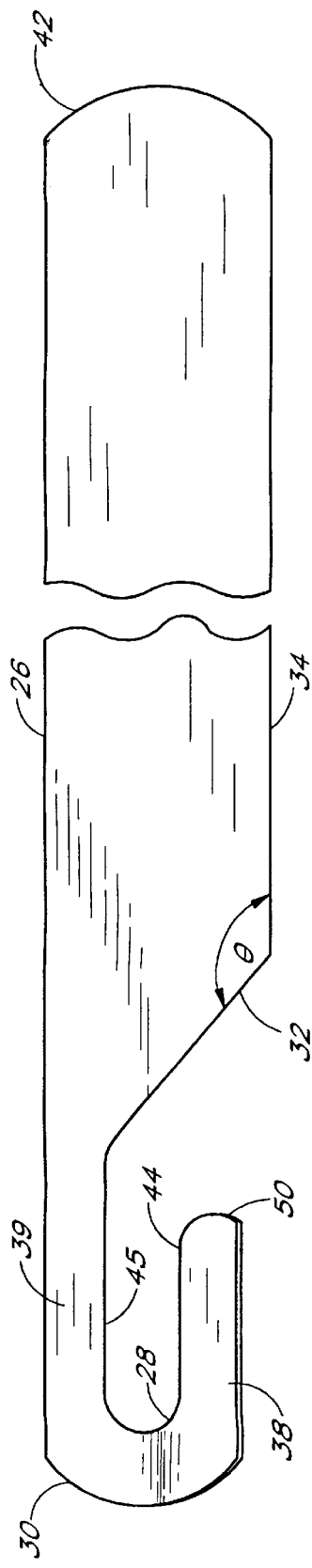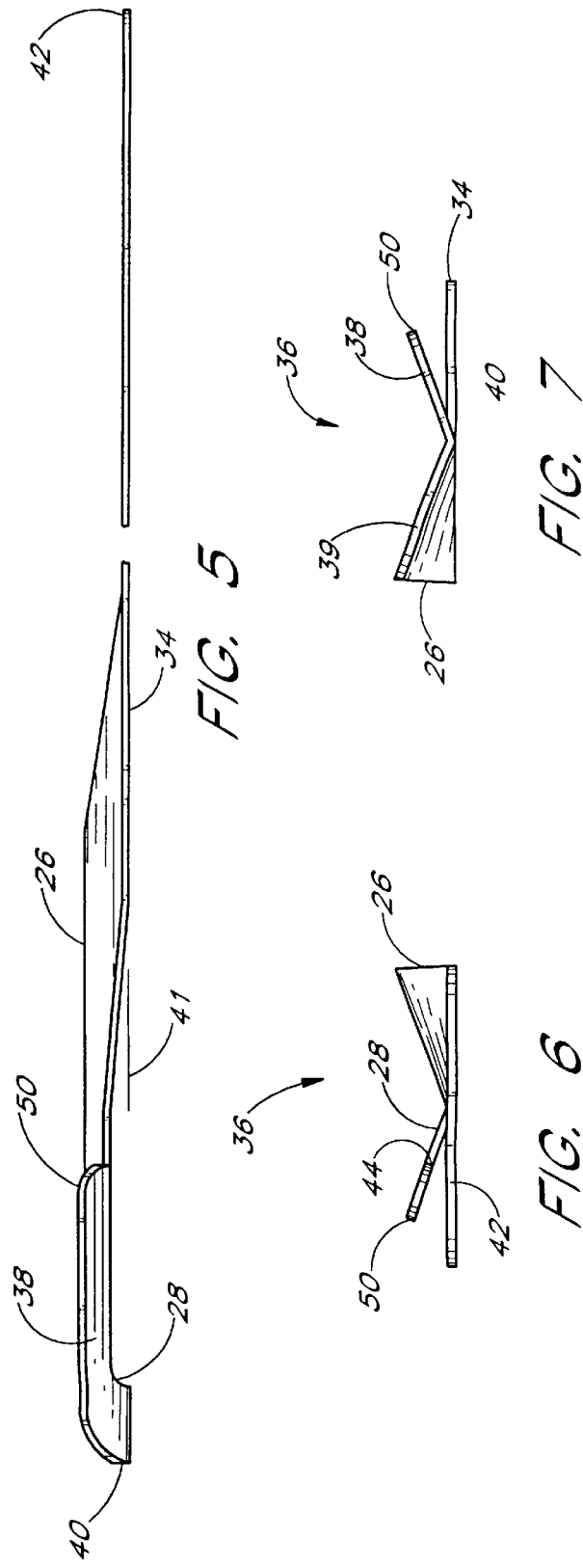

5,947,424

PIPE SUPPORT ASSEMBLY WITH RETAINING STRAP

BACKGROUND OF THE INVENTION

The present invention relates to devices for hanging pipes below ceilings and beams, and, in particular, to a retaining strap for use with C-type clamps on I-beams.

A variety of pipe hanging products are utilized to suspend piping from ceilings and beams in various buildings. The piping circuits utilize clamps, hooks, straps, plates, brackets, and the like along with hanger rods and such. The hanger rods are threaded and have attached to their lower ends ring hangers, clevis hangers, J-hangers, or other types of hangers which support pipes of varying sizes.

For suspension of piping from I-beams, a C-type clamp is typically used to suspend a hanger rod which in turn is attached to a pipe support device such as described above. The upper end of the hanger rod is held by the clamp, while a set screw and nut secures the clamp to a flange of the beam. The nut is used to maintain the grip of the clamp onto the flange, so that loosening does not occur to the extent that the clamp and pipe support assembly loosen from the beam.

The effects of gravity and vibration due to earthquakes and other sources can cause the nut to loosen, however, so a retaining strap is typically used to further reduce the likelihood that the pipe support assembly will be dislodged from the beam flange. The strap may either have a hole or a slot on one end which is attached to the hanger rod or clamp set screw, while the other end is bent over the beam flange edge which is opposite the pipe support assembly in order to secure the strap on the beam. However, the use of present retaining straps with clamps on I-beams has been recognized as insufficient in some situations, and an additional nut at the strap is routinely threaded on the rod into engagement with the strap. The additional nut and the labor to install it of course undesirably adds to the cost.

SUMMARY OF THE INVENTION

A pipe support assembly constructed in accordance with the present invention overcomes deficiencies of the assemblies which utilize present retaining straps. This is accomplished by use of a beam clamp retaining strap having a beveled locking slot for gripping the threaded shaft of the hanger rod or set screw. A slotted end of the strap has slot edges which securely engage between minor and major thread diameters of the rod or screw. Thus, an additional nut for further fixation of the strap is not required, which eliminates the corresponding inventory and cost associated therewith.

A preferred method of manufacturing the beam clamp retaining strap includes fabricating a metallic strap of is substantially rectangular shape and punching a slot in the strap which extends inward from a long edge of the strap toward one end to form a slot entrance. The slotted end of the strap is then stamped into generally a V-shape, as viewed from the slotted end. The resultant edges of the slot of the strap are angled, or appear beveled, with respect to a threaded shaft that is inserted into the slot and securely engaged by the slot edges.

The invention further includes a preferred method of mounting a pipe support assembly which includes a beam clamp retaining strap with a beveled locking slot, a hanger rod, and a clamp using a set screw to mount to a beam. The method includes attaching the rod to the clamp, securing the clamp to the beam with the screw, positioning the strap over the clamp with the slot threadably engaged, and bending the unslotted end of the strap over an opposite edge of the beam, thereby securing the strap.

Further advantages and applications will become apparent to those skilled in the art from the following detailed description and the drawings referenced herein.

BRIEF DESCRIPTION OF THE DRAWINGS

FIG. 4 is a top plan view of the retaining strap constructed in accordance with the present invention.

FIG. 5 is a front elevational view of the retaining strap of FIG. 4.

FIG. 6 is a right end, elevational view of the retaining strap of FIG. 4.

FIG. 7 is a left end, elevational view of the retaining strap of FIG. 4.

DETAILED DESCRIPTION OF A PREFERRED EMBODIMENT

Figure 1:
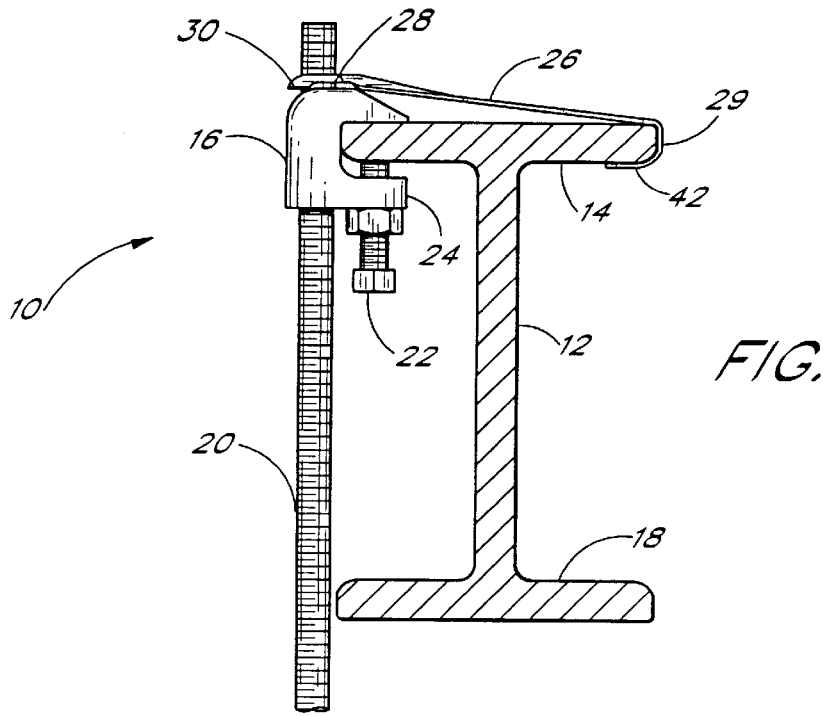
FIG. 1 is a perspective view of a preferred embodiment of a pipe support assembly constructed in accordance with the present invention, illustrating one of a possible four positions of a retaining strap over a C-type clamp on an I-beam.

FIG. 1 illustrates a preferred embodiment of a pipe support assembly 10 of the present invention for suspending a pipe from a raised support, which in this instance is an I-beam 12. The beam 12 may either be directly attached at its upper flange 14 to a ceiling, or the beam 12 may be attached through methods known to those skilled in the art which allow a space for a clamp 16 between the upper flange 14 and the ceiling. The latter situation is illustrated herein; although, the clamp 16 may also be used on a lower flange 18 of the beam 12, where the beam 12 is directly attached to the ceiling.

As illustrated in FIG. 1, the C-type clamp 16 is used to threadably receive a pipe hanger rod 20 from which a device for supporting a pipe (not shown), such as an adjustable ring hanger, is attached to the lower end of the hanger rod 20. Alternately, an eye rod, bolt, or the like may utilized in place of the rod 20 with the clamp 16. The clamp 16 is typically attached to the beam 12 with a set screw 22 adjusted to secure the clamp 16 onto the flange 14 of the beam 12. A nut 24 is tightened on the screw 22 to maintain the clamp position and help prevent its loosening. The clamp 16 may be positioned on the beam 12 such that the screw 22 either is outside of the upper or lower flange, 14 or 18, respectively, or is positioned between the flanges 14, 18 of the beam 12. As will be further described below, there are four possible configurations of the clamp 16 on the beam 12, each of which enjoy the advantages of the present invention.

Beam Clamp Retaining Strap

Figure 2:
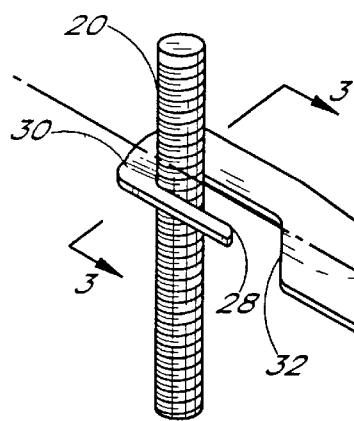
FIG. 2 is a perspective view of the attachment of the retaining strap to the threaded hanger rod as illustrated in FIG. 1.
Figure 3:
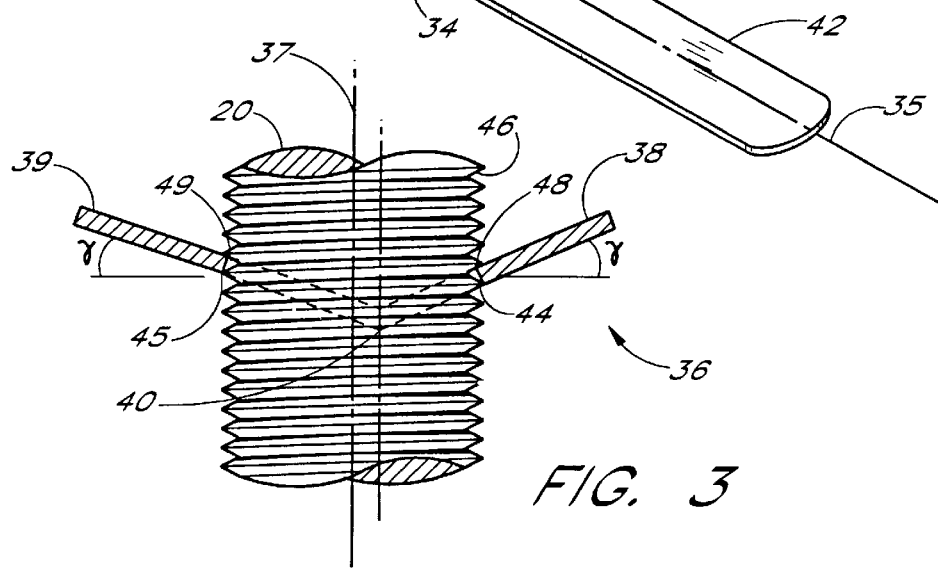
FIG. 3 is a cross-sectional view of the retaining strap taken along lines 3—3 of FIG. 2.

Referring in detail to FIGS. 2 and 3, a beveled slot 28 is located on an end 30 of a substantially rectangular strap 26 for locking in place around the rod 20. The rod 20 is received in the slot 28 from an entrance 32 at a longer edge 34 of the strap 26. The slot 28 extends toward the end 30 and is preferably centered along a central, longitudinal axis 35 of the strap 26. The width of the slot 28 is approximately equal to the diameter of the rod 20. A centerline 37 of the rod 20 is located along this central axis 35 of the strap 26 when the rod 20 is fully inserted in the slot 28. In alternate embodiments, the slot 28 may be formed such that it is not centered along the axis 35 of the strap 26, such that the rod centerline 37 does not coincide with the strap axis 35.

Referring now to FIGS. 4–7, details of the retaining strap 26 having the beveled locking slot 28 are illustrated. As illustrated in FIG. 4, the preferred embodiment of the strap 26 has generally a rectangular shape with rounded corners, although other shapes may also be utilized. The strap 26 preferably ranges from about 1 to 1¼ inches wide and is about 1/16 inch thick for engagement of rods having 3/8 to ½ inch diameters. As mentioned, the slot width of the strap 26 substantially corresponds to the diameter of the rod 20 with which it is to be used, whereas the slot entrance 32 is slightly larger to facilitate insertion of the rod 20. Approximately 2 inches of the strap 26, measured from the slotted end 30, is bent parallel to the longitudinal axis 35.

Although the strap 26 is shown to form an obtuse angle θ at the slot entrance 32, various angles may be formed in alternate embodiments, as long as the entrance 32 accommodates the diameter of the rod 20. A tab or cantilever portion 50 of the slotted end 30 of the strap 26 is preferred to be somewhat rounded at its end, as illustrated in FIG. 4, for easier entry of the rod 20 into the slot 28. The length of the slot 28 from its closed end to the entrance 22 is preferably two to three times the diameter of the rod 20, for very positive securement.

Referring now in detail to FIG. 3, it is preferred that the longitudinal bending or stamping of the slotted end 30 of the strap 26 result in an offset from the central axis 35 and the formation of a generally V-shape 36 having one leg 38 shorter than its other leg 39. That is, a crease or base 40 of the V-shape 36 is not collinear with, but is offset and parallel to, the central axis 35. It is understood, however, that the legs 38, 39 may also be of equal lengths, either by alignment of the base 40 with the axis 35, or by having the slot 28 centered at the base 40. Equal or unequal length legs 38, 39 are satisfactory, so long as the slot edges 44, 45 securely engage between the minor and major threaded diameters of the rod 20. The angle between the legs 38, 39 of the V-shape 36 is preferably about 135 degrees, with each leg 38, 39 having an angle y of approximately 22.5 degrees above a plane 41 formed by the unslotted end 42 of the strap 26. In alternate embodiments, the angle of each leg 38, 39 measured relative to this plane 41 may be different and more or less than that amount, as preferred.

The angle of the thread on the rod 20 and on the set screw 22 is about 60°. The slot edge is 90°. Thus, a more complete engagement of the slot edges with the thread if the angle of the V-shape were about 90°, with the angle y being about 45°. However, to form 90° V-shape angle would require a wider slot in the flat strap. That, in turn, would reduce the strength of the connection of the slotted end of the strap to the unslotted portion. The strap could be increased in width, but the added cost and the force to bend the unslotted end around a beam flange. On balance, the arrangement shown seems most practical and yet provides adequate retention to the threads.

In a working embodiment of the strap, the outer diameter of the threaded rod is about 0.040 inches larger than the width of the slot as measured at the inner corner edges. This overlap provides adequate retention, but of course the degree of interference could be varied.

It should also be noted from FIG. 3 that the pitch of the thread, that is, peak to peak dimension, is about equal to the strap thickness. Obviously threads of a different pitch or straps of different thickness can be employed.

It is further shown in FIG. 3 that the inner edges 44, 45 of the legs 38, 39, respectively, appear angled or beveled with respect to threads 46 of the rod shaft. Although the slot edges 44, 45 seem beveled with respect to the portions 38, 39, in this embodiment they still are at right angles, such that the cross-sections of legs 38, 39 are rectangular, as shown. In other embodiments, during manufacture of the strap 26, the slot 28 may be formed with beveled edges for engagement of the threaded rod 20, wherein cross-sections of the legs 38, 39 are not rectangular and the edges 44, 45 form acute angles. The angled edge could be formed by machining but that would not be economically practical. A beveled edge could also possibly be formed by deforming the edge in a stamping process, but forming the shallow V-shape and using the cover the stamp edge is easier. With a beveled edge with an acute angle, the slotted end 30 does not require stamping to a V-shape in order to create the beveled locking slot 28; however, the bending approach is preferred from the standpoint of manufacturing cost.

In other embodiments the beveled slot 28 may be engaged with the rod 20 where the V-shape 36 is inverted. Uninverted, the beveled edge 44 of the shorter leg 38 is received into a lower threaded portion 48 of the rod 20 than the edge 45 of the longer leg 39, as a result of the V-shape base 40 being offset from the central axis 35 of the strap 26. Conversely, if the strap 26 is installed to have an inverted V-shape, the shorter leg 38 would engage a higher threaded portion 49 of the rod 20. As shown in FIG. 3, the engagement of the slot edges 44, 45 is preferably 180 degrees apart, rather than 540 (180+360) degrees, 900 (540+360) degrees, etc.

Stated differently, due to the helical nature of the threaded shafts, the edges 44, 45 are not level with each other, with respect to the plane 41. With engagement of the thread being close to 180° apart, the differential between the two edges is equal to one half of the thread pitch. The engagement of the slot edges 44, 45 with the rod threads 46 produces an improved grip of the rod 20. Thus, the strap 26, clamp 16, and remainder of the support assembly 10 are reliably secured to the I-beam 12, and the need for an additional nut to secure the strap 26 and clamp 16 is eliminated.

Method of Mounting the Assembly

In using the strap, a hanger rod 20 is attached to a clamp 16, and the clamp is secured to the beam 12 with the set screw 22. After positioning the strap 26 over the clamp 16 with the slot 28 threadably engaged with the rod, the unslotted end 42 of the strap 26 is bent over the opposite edge 29 of the beam 12, thereby securing the strap 26 and clamp 16.

Although the retaining strap 26 is described herein for engagement with the hanger rod 20 in securing the clamp 16 to the beam 12, it is known in the art to engage the strap 26 with the screw 22 when the screw 22 is positioned above the upper flange 14 or below the lower flange 18 and generally blocks access by the strap 26 to the rod 20. That is, the strap 26 engages the threads of the screw 22 between the nut 24 and the head of the screw 22 instead of the threads of the rod 20. The application of the retaining strap 26 to the screw threads is similarly described herein by replacing the threaded rod 20 with the set screw 22 in the foregoing and following description. That is, the construction and attachment of the retaining strap 26 in the present invention is substantially the same whether engaged with the rod 20 or the screw 22.

Figure 8:
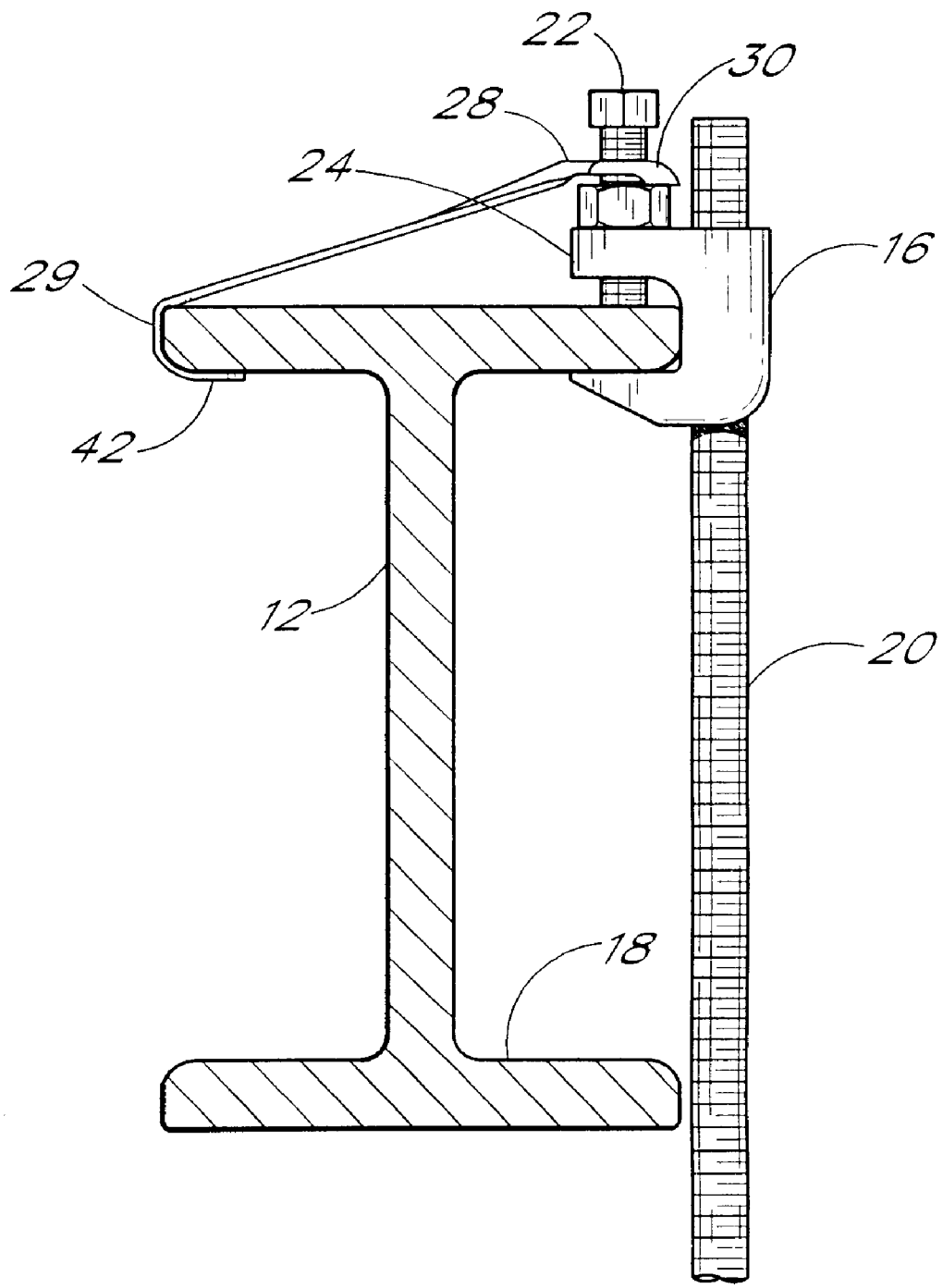
FIG. 8 is a perspective view of an alternative attachment of the retaining strap to the shaft of the set screw.

As aforementioned, there are four possible attachments of the strap 26, wherein the strap 26 may engage either the rod 20 (FIG. 2) or the screw 22 (FIG. 8) and the clamp 16 may be fastened to either the upper or lower flange 14 or 18, respectively, of the beam 12. When the clamp 16 is attached as shown in FIG. 1, the strap 26 engages the rod 20 above the upper flange 14. If the clamp 16 were to be attached to the upper flange 14 such that the screw 22 is positioned above the flange 14, then the strap 26 would engage the screw 22, and not the rod 20. If the clamp 16 were to be attached to the lower flange 18 such that the screw 22 is between the flanges 14, 18, then the strap 26 would again engage the rod 20, this time below the lower flange 18. Finally, if the clamp 16 were attached to the lower flange 18 such that the screw 22 is positioned below the lower flange 18, then the strap 26 would engage the screw 22 and not the rod 20.

From the foregoing description of the pipe support assembly with beam clamp retaining strap, as constructed in accordance with the present invention, it is readily appreciated that an additional nut for further fixation of the strap and clamp is not required. Thus, the additional inventory and associated cost of utilizing this nut with the strap is eliminated. Utilization of this retaining strap with the beveled locking slot therefore yields a cost savings in addition to not having to stock separate straps for both new piping installations and retrofitting purposes.

The retaining strap with beveled locking slot which is illustrated and described above is provided in connection with a preferred embodiment of the beam clamp retaining strap and pipe support assembly of the present invention. Other changes and modifications can be made from the embodiment presented herein by those skilled in the art without departure from the spirit and scope of the invention, as defined by the appended claims.

What is claimed is:

1. A retaining strap for a pipe support assembly having a clamp for attachment to a beam and a threaded shaft threadably connected to said clamp, said strap comprising a substantially rectangular member having a first end with a beveled locking slot for securing said clamp to said beam and a second end for securing said strap to said beam, at least a portion of said first end forming a plane that is offset from a plane formed by said second end, said slot including a first leg with a slot edge and a second leg with a slot edge, said edges capable of engaging said shaft between its major and minor thread diameters, a longitudinal outer edge of a portion of said first end is spaced farther from said plane of said second end than are said slot edges.

2. The retaining strap of claim 1 wherein said first and second legs are positioned at an angle with respect to each other, the cross sections of said legs being generally rectangular with the result that an approximately 90° corner of each of said leg cross sections form said slot edges.

3. The retaining strap of claim 1, wherein said slot edges are configured to engage said shaft at threaded portions spaced about 180 degrees apart on said shaft.

4. The retaining strap of claim 1, wherein said first and second legs are formed by stamping to form a V-shaped cross section having an indented angle of approximately 135 degrees.

5. A retaining strap for a pipe support assembly, said assembly having a clamp for attachment to a beam and a threaded shaft threadably connected to said clamp, said strap comprising a substantially rectangular member having a first end with a beveled locking slot for securing said clamp to said shaft and a second end for securing said strap to said beam, said slot formed by two legs of said first end forming a V-shape of unequal leg lengths, said slot legs having planes forming acute angles with respect to the plane formed by said second end of said strap such that edges of said slot legs are capable of engaging said shaft between its major and minor thread diameters.

6. The retaining strap of claim 5, wherein said edges are adapted engage threaded portions of said shaft located no more than about 180 degrees apart.

7. The retaining strap of claim 5, wherein said acute angles of said slot legs are about 22.5 degrees to form an included angle of about 135 degrees between said slot legs.

8. A pipe support assembly for suspending a pipe from a raised support, comprising:

a threaded pipe hanger rod;

a clamp for attachment to the raised support, said rod being threadably received through said clamp;

a set screw for securing said clamp to the raised support; and a retaining strap having a locking slot on a first end sized to receive said rod or said screw, and a second end adapted to anchor to the raised support, said locking slot including a first leg with a slot edge and a second leg with a slot edge, said slot edges of said locking slot configured to engage between a major thread diameter and a minor thread diameter of said rod or said screw;

wherein at least a portion of said first end forms a plane that is offset from a plane formed by said second end and wherein a longitudinal outer edge of a portion of said first end is spaced farther from said plane of said second end than are said slot edges.

9. The pipe support assembly of claim 8, wherein said slot of said strap engages said rod.

10. The pipe support assembly of claim 8, wherein said slot of said strap engages said set screw and is positioned between said clamp and a head of said screw.

11. The pipe support assembly of claim 8, wherein when said strap is viewed from the first end, said first leg and said second leg of said locking slot form an obtuse angle of approximately 135 degrees.

12. The pipe support assembly of claim 8, wherein said first leg and said second leg each form an acute angle relative to a plane formed by said second end of said strap.

13. The pipe support assembly of claim 8, wherein said slot edges of said first and second legs are positioned at an angle of no more than about 90° such that the cross-sections of said legs are generally rectangular.

14. The pipe support assembly of claim 8, wherein said slot edges engage between said major thread diameter and said minor thread diameter of said rod or said screw, at locations about 180 degrees apart about said rod or said screw.

15. A retaining strap for a pipe support assembly having a clamp for attachment to a beam and a threaded shaft threadably connected to said clamp, said strap having a first end with a locking slot for securing said strap to said shaft, and a second end for securing said strap to said beam, said slot being formed by two legs of said first end forming a substantially V-shape when said strap is viewed from said first end, each of said legs having a substantially linear slot edge, with the edges being substantially parallel to each other, said slot having an end open to an exterior edge of said strap with the open end adapted to be larger than the shaft to be received therein, said open end leading to said linear edges, said linear edges adapted to be spaced from each other a distance less than a major thread diameter of said shaft to be received therein, and more than a minor diameter of said shaft to be received therein so that the strap can slide onto said shaft to be received therein with the slot edges being adapted to engage said shaft to be received therein between its major and minor thread diameters.

16. The retaining strap of claim 15, in combination with a clamp for attachment to a beam and a threaded shaft threadably connected to said clamp, said slot linear edges being spaced from each other a distance less than a major thread diameter of said shaft and more than a minor thread diameter of said shaft so that the strap can slide onto said shaft with the slot edges engaging said shaft between its major and minor thread diameters.

17. A method for securing a pipe support assembly to a first edge of a beam utilizing a retaining strap having on one end a locking slot, said slot being formed by two legs of said one end and forming a substantially V-shape when said strap is viewed from said one end, each of said legs having a substantially linear slot edge, with the edges being substantially parallel to each other, said slot having a closed end and having an end open to an exterior edge of said strap, said assembly including a hanger rod having a threaded shaft, a clamp, and a set screw having a threaded shaft used for securing said clamp to the beam, said method comprising the steps of:

threadably attaching said rod to said clamp;

securing said clamp to one edge of said beam with said set screw;

sliding said slot open end onto one of said shafts with each of said slot edges of said strap engaged between major and minor diameters of said one shaft to the point where the closed end of said slot engages said one shaft; and bending a second end of said strap over an opposite edge of the beam thereby securing said strap to said one shaft and to said beam.

18. The method of claim 17, wherein said sliding step is performed on the threaded shaft of said hanger rod.

19. The method of claim 17, wherein said sliding step is performed on the threaded shaft of said set screw.

* * * * *